United States Patent
Wan

(10) Patent No.: US 10,404,731 B2
(45) Date of Patent: Sep. 3, 2019

(54) METHOD AND DEVICE FOR DETECTING WEBSITE ATTACK

(71) Applicant: BEIJING HANSIGHT TECH CO., LTD, Haidian (CN)

(72) Inventor: Xiaochuan Wan, Haidian (CN)

(73) Assignee: BEIJING HANSIGHT TECH CO., LTD., Haidian (CN)

( * ) Notice: Subject to any disclaimer, the term of this patent is extended or adjusted under 35 U.S.C. 154(b) by 57 days.

(21) Appl. No.: 15/570,585

(22) PCT Filed: Mar. 11, 2016

(86) PCT No.: PCT/CN2016/076150
§ 371 (c)(1),
(2) Date: Oct. 30, 2017

(87) PCT Pub. No.: WO2016/173327
PCT Pub. Date: Nov. 3, 2016

(65) Prior Publication Data
US 2018/0139222 A1    May 17, 2018

(30) Foreign Application Priority Data

Apr. 28, 2015 (CN) .......................... 2015 1 0205528
Jun. 5, 2015 (CN) .......................... 2015 1 0303217

(51) Int. Cl.
*H04L 29/06* (2006.01)
*H04L 12/26* (2006.01)

(52) U.S. Cl.
CPC .......... *H04L 63/1425* (2013.01); *H04L 43/04* (2013.01); *H04L 63/101* (2013.01);
(Continued)

(58) Field of Classification Search
CPC ........ G06F 21/51; G06F 16/951; G06F 16/84; G06Q 10/0635; H04L 63/1425;
(Continued)

(56) References Cited

U.S. PATENT DOCUMENTS 8,627,466 B2 *   1/2014   Fisher ................... G06F 21/554
                                                                   726/22
9,516,039 B1 *  12/2016   Yen .......................... H04L 63/14
(Continued)

FOREIGN PATENT DOCUMENTS

CN    101727447    6/2010
CN    102254111    11/2011
(Continued)

OTHER PUBLICATIONS

Web Attack Detection: Classifying Parameter Information according to Dynamic Web page by Jaechul Park and Bongnam Noh International Journal of Web Services Practices, vol. 2, No. 1-2 (Dec. 13, 2006), pp. 68-74 pp. 7 (Year: 2006).*
(Continued)

*Primary Examiner* — William J. Goodchild
*Assistant Examiner* — Ali H. Cheema
(74) *Attorney, Agent, or Firm* — Bond Schoneck & King, PLLC; George McGuire; William Greener

(57) ABSTRACT

The present invention provides a method for detecting a website attack, comprising: selecting multiple uniform resource locators (URLs) from history access records of a website; clustering the multiple uniform resource locators; and generating a whitelist from the multiple uniform resource locators according to a clustering result. In some embodiments of the present invention, a common OWASP attack at URL level can be checked.

10 Claims, 5 Drawing Sheets

(52) U.S. Cl.
CPC .......... *H04L 63/1458* (2013.01); *H04L 63/10* (2013.01); *H04L 63/14* (2013.01)

(58) Field of Classification Search
CPC . H04L 63/0245; H04L 63/14; H04L 63/1408; H04L 43/04; H04L 63/1458; H04L 63/10; H04L 63/101
USPC ................... 726/11, 22, 23, 1, 24; 705/7.28; 717/116; 709/219; 707/827
See application file for complete search history.

(56) References Cited

U.S. PATENT DOCUMENTS

| | | | |
|---|---|---|---|
| 2002/0019857 A1* | 2/2002 | Harjanto | H04L 29/12132 709/219 |
| 2007/0245310 A1* | 10/2007 | Rosenstein | G06Q 30/02 717/116 |
| 2011/0320414 A1 | 12/2011 | Sim et al. | |
| 2012/0046989 A1* | 2/2012 | Baikalov | G06Q 10/0635 705/7.28 |
| 2012/0096058 A1* | 4/2012 | Mameri | G06F 16/9574 707/827 |
| 2014/0130167 A1* | 5/2014 | Lee | H04L 63/1408 726/24 |
| 2015/0058982 A1* | 2/2015 | Eskin | G06F 16/84 726/23 |
| 2015/0237061 A1* | 8/2015 | Shraim | H04L 63/1425 726/22 |
| 2016/0099967 A1* | 4/2016 | Stemm | G06F 16/951 726/1 |
| 2017/0053031 A1* | 2/2017 | Dong | G06F 16/951 |
| 2018/0027006 A1* | 1/2018 | Zimmermann | H04L 63/0245 726/11 |
| 2018/0145993 A1* | 5/2018 | Akiyama | G06F 21/51 |

FOREIGN PATENT DOCUMENTS

| | | | |
|---|---|---|---|
| CN | 103428196 A | * | 4/2013 |
| CN | 103428196 | | 12/2013 |

OTHER PUBLICATIONS

Application layer DDoS attack detection using cluster with label based on sparse vector decomposition and rhythm matching. Qin Liao*, Hong Li, Songlin Kang and Chuchu Liu Published on Mar. 13, 2015 (Year: 2015).*
A high performance URL lookup engine for URL filtering system IEEE ICC 2010, pp. 5 Zhou Zhou, Tian Song* (Year: 2010).*
How to identify malicious HTTP requests—Niklas Sarokaari Nov. 13, 2012, pp. 28 (Year: 2012).*
International Search Report, Form PCT/ISA/210, International Application No. PCT/CN2016/076150, International Filing Date Mar. 11, 2016.

* cited by examiner

METHOD AND DEVICE FOR DETECTING WEBSITE ATTACK

CROSS-REFERENCE TO RELATED APPLICATIONS

This application is the United States National Stage application under 35 U.S.C. 371 of PCT/CN2016/076150, filed Mar. 11, 2016, which claims priority to Chinese Application Serial Numbers CN201510205528.7, filed Apr. 28, 2015, and CN201510303217.4, filed Jun. 5, 2015, the entire disclosure of each of which is incorporated herein by reference.

FIELD OF THE INVENTION

The present invention relates to the technical field of network security, particularly to a method and a device for detecting a website attack.

BACKGROUND OF THE INVENTION

Currently, the field of information security is confronted with various challenges. On the one hand, security architectures of enterprises are becoming increasingly complicated, and more and more various types of security devices and security data are emerged, which makes conventional analysis capacity obviously powerless; on the other hand, with the rise of new threats, such as APT (Advanced Persistent Threat), and with the further development of internal control and compliance, there is a growing need to store and analyze more security information and to make decisions and responses more quickly.

Conventionally, it would take several days or even several months to know inconspicuous security threats, because it's difficult for a large number of uncorrelated data to be constituted a concise and organized "puzzle" of event. The greater the amount of data collected and analyzed, the more chaotic the data appears, the longer the time required to reconstruct the event. If the attack is fast and ferocious, spend a few days or months to diagnose the problem will bring huge compliance and financial impact. Therefore, there is a need to improve this situation. In case of a fast and ferocious attack (for example, denial of service attack or rapidly spreading worms), it may lead to significant influences on compliance and finance to spend several days or even several months to diagnose the problems. Therefore, there is a need for improving such situation.

SUMMARY OF THE INVENTION

According to one aspect of the present invention, a method for detecting a web site attack is provided, comprising: selecting multiple uniform resource locators (URLs) from history access records of a website; clustering the multiple uniform resource locators; and generating a whitelist from the multiple uniform resource locators according to a clustering result.

According to another aspect of the present invention, a device for detecting a web site attack is provided, comprising: a selecting unit for selecting multiple uniform resource locators (URLs) from history access records of a website; a clustering unit for clustering the multiple uniform resource locators, and a generating unit for generating a whitelist from the multiple uniform resource locators according to a clustering result.

Embodiments of the present invention may include one or more of the following technical features.

The multiple uniform resource locators correspond to a HTTP response status which may be that a request has been successful.

At least a portion of the multiple uniform resource locators correspond to a user who may belong to the largest category obtained by clustering users of the website.

Clustering the multiple uniform resource locators may comprise: decomposing each of the multiple uniform resource locators into a URL string, a directory in the URL string and a URL request parameter to generate a subset of URL strings, a subset of directories in the URL string, and a subset of URL request parameters.

The multiple uniform resource locators are clustered according to the subset of URL strings. A number, a globally unique identifier (GUID) or a BASE64-encoded substring in the URL string is identified to determine a URL string clustering distance.

The multiple uniform resource locators are clustered according to the subset of directories in the URL string. A directory clustering distance is determined by subtracting the number of duplicate directories in two directories from the number of directories obtained by splicing the directories in two URL strings.

The multiple uniform resource locators are clustered according to the subset of URL request parameters. For a unique parameter name in each of the multiple uniform resource locators, all of the parameter values that have appeared corresponding to the unique parameter name are clustered. Or, all of the parameter names that appear in the multiple uniform resource locators are individually clustered.

In a case where the multiple uniform resource locators are clustered according to the subset of URL strings, the subset of directories in the URL string and the subset of URL request parameters, respectively, the percentiles of the categories to which each URL string, URL directory, and URL request parameter in the corresponding subset belongs are determine as an outlier.

A total outlier of a corresponding URL is determined by adding the outlier of the URL string, the outlier of the directory in the URL string, and the outlier of the URL request parameter together.

A uniform resource locator whose total outlier is below a threshold is registered into a whitelist.

Some embodiments of the present invention may have one or more of the following benefits: unsupervised learning may be achieved without cold start; the generated result is a blacklist/whitelist which can be modified by a user; and a common OWASP attack at URL level can be checked.

Other aspects, features, and benefits of the present invention will be more apparent from the detailed embodiments, appended drawings, and claims.

BRIEF DESCRIPTION OF THE DRAWINGS

Hereinafter the present invention will be described in more details with reference to the drawings, in which.

DETAILED DESCRIPTION OF THE INVENTION

Figure 1:
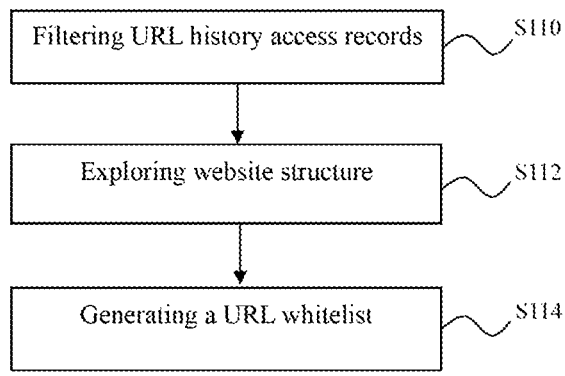
FIG. 1 is a flow chart of a method for detecting a website attack according to the present invention.

Referring to FIG. 1, the URL history access records of a website is filtered in step S110.

There are usually normal URLs and malicious URLs mixed in the URL history access records, from which multiple normal URLs or multiple at least almost normal URLs are selected by filtering.

Figure 2:
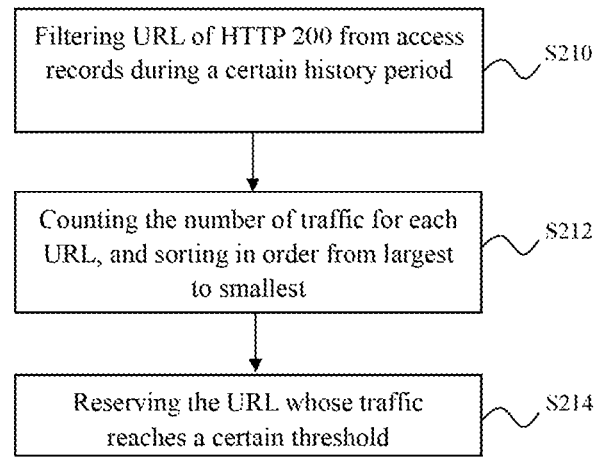
FIG. 2 is a flow chart of filtering URL history access records according to an embodiment of the present invention.

Referring to FIG. 2, it further illustrates the step S110 in FIG. 1, wherein the URL history access record is subjected to HTTP 200 filtering. Wherein, a HTTP status code is defined according to RFC (Request for Comments) 2616 standards and used for representing a response status of a webpage server HTTP. As one of the HTTP status codes, HTTP 200 indicates that a request has been successful and the desired response header or data body of the request will be returned along with the response.

Step 210, when HTTP 200 filtering is performed, a certain history period may be selected and a URL access record with a response status of 200 may be filtered from the HTTP access record during this history period.

Step S212, the number of access times (traffic) of each of the URLs is counted, and sorted in descending order from largest to smallest. Table 1 is an exemplary statistical result.

TABLE 1

| URL | Traffic |
| --- | --- |
| http://www.example.com/a.html | 100 |
| http://www.example.com/b.html | 80 |
| http://www.example.com/c.html | 40 |
| ... | ... |
| http://www.example.com/y.html | 1 |
| http://www.example.com/z.html | 1 |

Step S214, the URL whose traffic reaches a certain threshold (for example, the first 90%) is reserved according to the statistical results. For example, assuming that the total number of traffic in Table 1 is 300, only URLs with a traffic greater than 30 are reserved. Taking table 1 as an example, the three URLs " . . . /a.html", " . . . /b.html" and " . . . /c.html" will be reserved, while the two URLs " . . . /y.html" and " . . . /z.html" will be excluded. Herein, the threshold of 90% may also be set to other values according to different websites.

Returning to FIG. 1, in step S112, the website structure is explored based on the multiple URLs obtained upon filtering.

The websites of large and medium-sized enterprises, especially those developed by utilizing advanced WEB framework, usually have relatively organized structures. For example, the domain name is a normal combination of Chinese phonetic abbreviations, or a normal combination of English word abbreviations, or follows a similar naming convention; the URL structure tree has a reasonable structure, and the same content is located in the same URL directory; for the URL allowing the request with parameters, the parameters also follow similar naming conventions. Based on the definitions of RFC1738 standards, the URL is in a format of "scheme://[user: password@]domain:port/path?query_string#fragment_id", wherein "query_string" contains several "key=value" formats separated by symbols "&", wherein "key" denotes a parameter, and "value" denotes a parameter value. For example, "field1=value1&field2=value2&field3=value3" contains three parameters which are "filed 1", "field 2" and "filed 3", respectively; and also contains three parameter values which are "value 1", "value 2" and "value 3", respectively.

Table 2 illustrates an example of the website structure.

TABLE 2

| | URL |
| --- | --- |
| 1 | https://www.example.com/gp/yourstore/home?ie=UTF8&ref_=nav_cs_ys |
| 2 | http://www.example.com/gp/goldbox/ref=nav_cs_gb |
| 3 | http://www.example.com/gift-cards/b/ref=nav_cs_gc?ie=UTF8&node=2238192011 |
| 4 | http://www.example.com/gp/seller-account/mm-product-page.html/ref=nav_cs_sell?ie=UTF8&ld=AZSOAUSCSNav |
| 5 | http://www.example.com/gp/help/customer/display.html/ref=nav_cs_help?ie=UTF8&nodeId=508510 |
| 6 | http://www.example.com/gp/product/0811219119/ref=s9_psimh_gw_p14_d10_i3?pf_rd_m=ATVPDKIKX0DER&pf_rd_s=desktop-1&pf_rd_r=03ZVG7VH6MMR9P09NMSB&pf_rd_t=36701&pf_rd_p=1970559082&pf_rd_i=desktop |
| 7 | http://www.example.com/gp/product/0811221105/ref=s9_psimh_gw_p14_d10_i5?pf_rd_m=ATVPDKIKX0DER&pf_rd_s=desktop-1&pf_rd_r=03ZVG7VH6MMR9P09NMSB&pf_rd_t=36701&pf_rd_p=1970559082&pf_rd_i=desktop |

As it can be seen from the example illustrated in Table 2, every directory denotes a type of function, and the parameters (e.g., "ref", "node", "nodeID" and "pf_rd_t") only contain lowercases, numbers and underlines "_".

Figure 3:
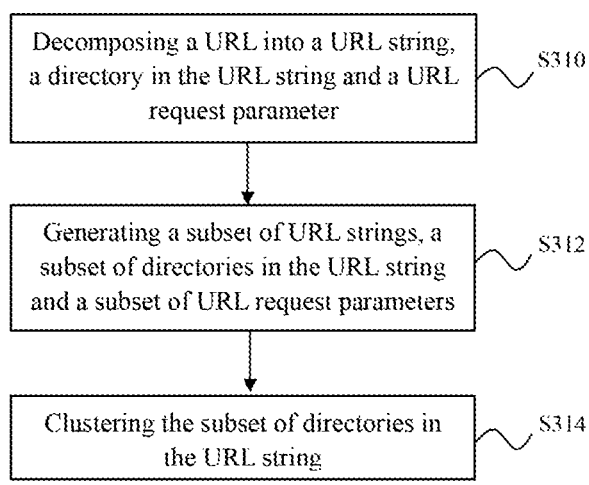
FIG. 3 is a flow chart of exploring a website structure according to an embodiment of the present invention.
Figure 4:
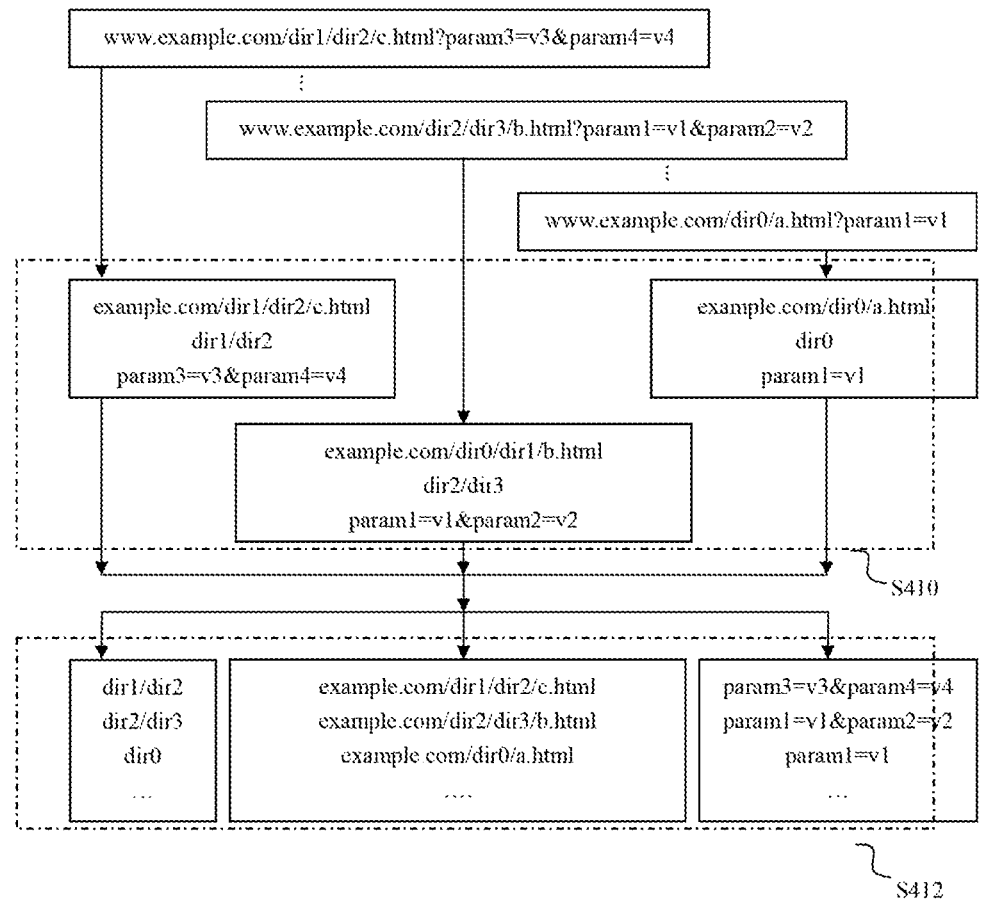
FIG. 4 is a schematic diagram of generating respective subsets of a URL according to the present invention.
Figure 5:
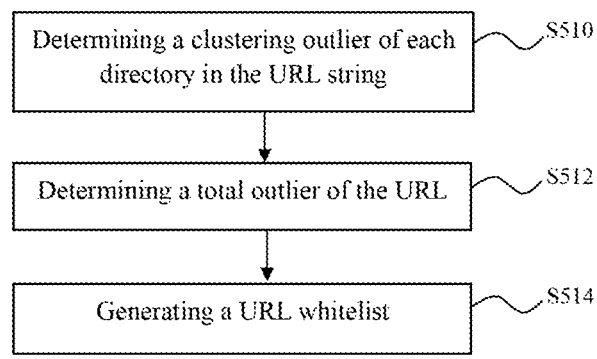
FIG. 5 is a flow chart of generating a whitelist according to an embodiment of the present invention.

Referring to FIGS. 3 and 4, wherein FIG. 3 is an illustration of an embodiment in which a URL structure is decomposed and clustered. In step S310, each of the URLs is decomposed into structures as below: URL string, directory in the URL string, and URL request parameter. Wherein, the URL string does not contain a parameter, while the URL request parameter contains combination of each pair of parameter names and parameter values in the URL.

FIG. 4 illustrates the process of decomposing the URL structure and generating the corresponding subsets, with reference to three illustrative URLs, by way of example. As illustrated in step S410, one of the URLs, "www.example.com/dir0/a.html?param1=v1" is correspondingly decomposed into "example.com/dir0/a.html" (a URL string), "dir0" (a directory in the URL string), and "param1=v1" (a URL request parameter).

Step S312, by decomposing the above-mentioned structure of each of the URLs, three subsets are generated from the several URLs obtained upon filtering, that is, a subset of URL strings, a subset of directories in the URL string, and a subset of URL request parameters. Step S412 illustrates the three subsets as generated.

In step S314, the subset of directories in the URL string is clustered.

As an important concept in data analysis, clustering refers to a process that divides a collection of physical or abstract objects into several categories that consist of similar objects. The categories generated by clustering are a collection of data objects that are similar to the objects in the same category and are different from the objects in other categories.

Any clustering algorithm that supports editing distances can be used to cluster the subset of directories in the URL string, such as OPTICS, DBSCAN.

Wherein, OPTICS (Ordering Points To Identify the Clustering Structure) is an algorithm for finding density-based clusters (or categories) in spatial data. The basic idea of OPTICS is similar to that of DBSCAN (Density-Based Spatial Clustering of Applications with Noise), but overcomes one of the weaknesses of DBSCAN, that is, determining a meaningful cluster in density-varying data. For this reason, the points in the database are (linearly) sorted so that the nearest points in the space become neighbors in the sorting process. In addition, in order to make the two points belong to the same cluster, a specific distance is stored for each point, which represents the density that needs to be accepted to constitute a cluster.

The OPTICS algorithm mainly involves two parameters, eps and MinPts, wherein eps denotes the maximum distance (radius) that the algorithm needs to consider, MinPts denotes the number of points required to constitute a cluster. It should be noted that the OPTICS algorithm itself is not sensitive to the parameters, different eps and MinPts may also get similar results. A standard pseudo-code of the OPTICS algorithm is as follows:

wherein getNeighbors (p, eps) represents all the points within a distance of eps from a particular point p. And core-distance (p, eps, Minpts) represents whether the number of points within a distance of eps from p exceeds Minpts, and if it does not exceed, UNDEFINED is retuned, and if it exceeds, the distances are sorted from shortest to longest, and a distance which is the Minpts$^{th}$ shortest is retuned.

```
OPTICS(DB, eps, MinPts)
    for each point p of DB
        p.reachability-distance = UNDEFINED
    for each unprocessed point p of DB
        N = getNeighbors(p, eps)
        mark p as processed
        output p to the ordered list
        if (core-distance(p, eps, Minpts) != UNDEFINED)
            Seeds = empty priority queue
            update(N, p, Seeds, eps, Minpts)
            for each next q in Seeds
                N' = getNeighbors(q, eps)
                mark q as processed
                output q to the ordered list
                if (core-distance(q, eps, Minpts) != UNDEFINED)
                    update (N', q, Seeds, eps, Minpts)
update(N, p, Seeds, eps, Minpts)
    coredist = core-distance(p, eps, MinPts)
    for each o in N
        if (o is not processed)
            new-reach-dist = max(coredist, dist(p,o))
            if (o.reachability-distance == UNDEFINED) // o is not in
Seeds
                o.reachability-distance = new-reach-dist
                Seeds.insert(o, new-reach-dist)
            else          // o in Seeds, check for improvement
                if (new-reach-dist < o.reachability-distance)
                    o.reachability-distance = new-reach-dist
                    Seeds.move-up(o, new-reach-dist)
```

As mentioned above, the idea of the DBSCAN algorithm is similar to that of OPTICS, and its standard pseudo-code is as follows:

```
DBSCAN(DB, eps, MinPts)
    for each point p of DB
        C = 0
    for each unvisited point P in dataset DB
        mark P as visited
        NeighborPts = regionQuery(P, eps)
        if sizeof(NeighborPts) < MinPts
            mark P as NOISE
        else
            C = next cluster
            expandCluster(P, NeighborPts, C, eps, MinPts)
expandCluster(P, NeighborPts, C, eps, MinPts)
    add P to cluster C
    for each point P' in NeighborPts
        if P' is not visited
            mark P' as visited
            NeighborPts' = regionQuery(P', eps)
            if sizeof(NeighborPts') >= MinPts
                NeighborPts = NeighborPts joined with NeighborPts'
        if P' is not yet member of any cluster
            add P' to cluster C
regionQuery(P, eps)
    return all points within P's eps-neighborhood (including P)
```

For simplicity, the clustering algorithms in the following embodiments of the present invention are exemplified by the standard OPTICS.

In step S314, the directory in the URL string is determined as a clustering feature; the clustering distance is determined by subtracting the number of duplicate directories in the two directories from the number of directories obtained by splicing the directories in the two URL strings.

Table 3 illustrates an example of determining the directory clustering distance.

TABLE 3

| Directory in the URL String | Clustering Distance |
| --- | --- |
| dir1/dir2, dir1 | Dist(dir1/dir2, dir1) = dir1/dir2 − dir1 = 2-1 |
| dir1/dir2, dir0 | Dist(dir1/dir2, dir0) = dir1/dir2dir0 − [ ] = 3-0 |
| dir1/dir2, dir2/dir3 | Dist(dir1/dir2, dir2/dir3) = dir1/dir2/dir3 − dir2 = 3-1 |

Hereinafter returning to FIG. 1, in step S114, the URL whitelist is generated from the multiple URLs obtained by filtering according to the result of the clustering.

The subset of directories in the URL string is divided into several categories in step S314. Each directory in the URL string in the subset belong to one of the categories. Step S510, by determining the percentile of the category, a clustering outlier of each directory in the URL string can be obtained. Step S512, the total outlier of the corresponding URL can be further determined according to the clustering outlier, wherein when only the subset of directories in the URL string is clustered, the total outlier is equal to the corresponding clustering outlier. Step S514, the URL with a total outlier below the threshold is registered into a whitelist. Here, the percentile of a category is the percentage of the number of objects in all categories that are larger than it relative to the total number of objects. For example, assuming that after clustering, the subset of directories in the URL string is divided into seven categories, in the order of 100, 80, 60, 14, 7, and 1, then the percentile of the smallest category is 1−1/(100+80+60+14+7+3+1)=99.6%, and the second smallest category is 1−(1+3)/(100+80+60+14+7+3+1)=98.5%, and so on. Correspondingly, in the smallest category, the clustering outlier of the directory in each URL string is 99.6%. The total clustering outlier of the URL is also 99.6% when only the subset of directories in the URL string is clustered.

Similarly, a URL with high outlier can be reported as an attack and registered in blacklist. The generated blacklist or whitelist can also be manually modified by a user. The threshold for the outlier can be set manually by a user, which can be set to 99 by default.

In the case of generating a URL whitelist, if the URL in the real-time URL access log is not listed in the whitelist, the URL will be treated as a malicious URL.

Other embodiments are also feasible.

Figure 6:
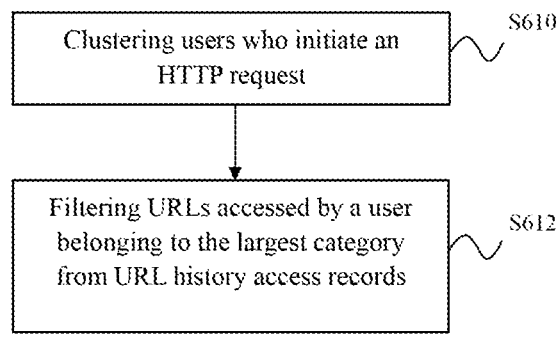
FIG. 6 is a flow chart of filtering URL history access records according to another embodiment of the present invention.

For example, the URL history access records of the website may be filtered by clustering users who initiate an HTTP request. Referring to FIG. 6, in step S610, the feature of clustering can be set to the user's URL access sequence; for example, a.html→b.html→c.html→d.html. Correspondingly, the distance function of the cluster is set to the URL access sequence distance (editing distance). For example, the distance between a sequence of a.html→b.html→c.html→d.html and a sequence of a.html→c.html→d.html is 1 (a deletion); and the distance between a sequence of a.html→b.html→c.html→d.html and a sequence of a.html→c.html→b.html→d.html" is also 1 (an exchange of c and b). It is also possible to perform clustering operations with other features and distance functions. For example, Only the unique URL that the user has visited is considered. As mentioned foregoing, clustering operations can use any clustering algorithm that supports editing distances, such as standard OPTICS or DBSCAN algorithms.

Both clustering the users initiating HTTP requests and performing HTTP 200 filtering may be adopted simultaneously, each serving as a rule in the hybrid filtering method, respectively, for filtering URL history access records, and then exploring the site structure. Moreover, the hybrid filtering method may further include other rules.

Figure 7:
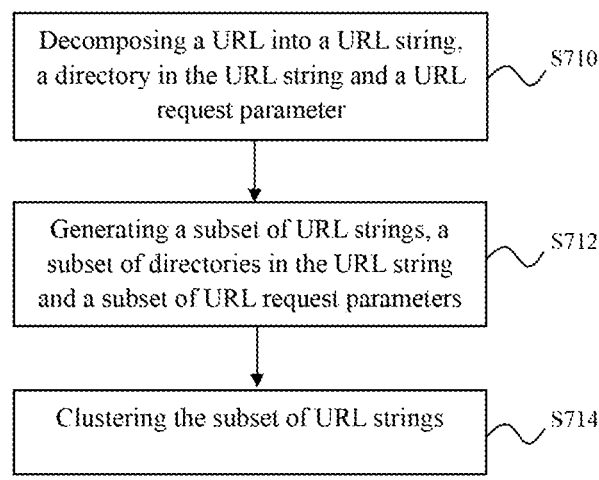
FIG. 7 is a flow chart of exploring a website structure according to another embodiment of the present invention.
Figure 8:
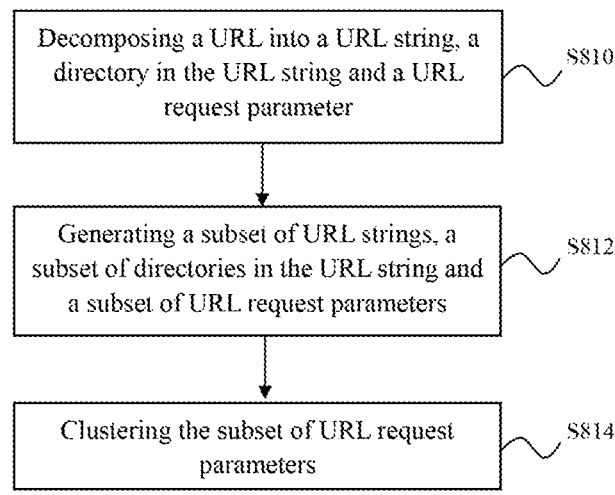
FIG. 8 is a flow chart of exploring a website structure according to yet another embodiment of the present invention.

According to the embodiments illustrated in FIG. 7 and FIG. 8, the subset of URL strings and the subset of URL request parameters may also be clustered separately after generating a subset of URL strings, a subset of directories in the URL string, and a subset of URL request parameters.

In step S714, the clustering feature is the URL string, and the clustering distance function is a weighted editing distance of URL string. As compared to a general editing distance, the weighted editing distance is distinguished by that it identifies a number, a globally unique identifier (GUID) and a BASE64-encoded substring from the URL string as a special character; otherwise, a character is just a symbol (a unit element of the URL string during clustering). For example, the distance between "123455.html" and "1.html" is 1, a distance between "7ca657b5-1110-43e7-bc5c-1ee25560e40f.html" and "7227db62-49aa-4c36-9a87-b0d737ab0ed7.htm" is also 1 (identified as a GUID); while the distance between "abc.html" and "a.html" is 2 (neither a number nor a GUID). As mentioned foregoing, any clustering algorithm that supports editing distances can be used, such as standard OPTICS or DBSCAN algorithms.

The subset of URL strings is divided into several categories in step S714. Correspondingly, every URL string in the subset belongs to one of the categories. Similar to clustering the subset of directories in the URL string, the clustering outlier for each URL string may be obtained by determining the percentile of the category to which the URL string belongs. Based on the clustering outlier, a total outlier of the corresponding URL may be further determined, wherein, the total outlier will be equal to the corresponding clustering outlier when only the subset of URL strings is clustered. The URL with a total outlier below the threshold is registered in the whitelist.

In step S814, for a unique parameter name under each unique URL, all the parameter values which have been appeared are clustered. For example, regarding the URL "http://abc.com/dir1/dir2/a.html?param1=v1&param2=v2" and the URL "http://abc.com/dir1/dir2/b.html?param1=v1&param2=v2", total four types of clustering processes need to be performed, which are, "abc.com/dir1/dir2/a.html?param1", "abc.com/dir1/dir2/a.html?param2", "abc.com/dir1/dir2/b.html?param1" and "abc.com/dir1/dir2/b.html?param2", wherein the clustering distance function is the weighted editing distance (similar to the URL string) of the parameter value. Alternatively, all of the parameter names that appear in all the URLs are individually clustered. For example, "param1" and "param2". As mentioned foregoing, standard OPTICS or DBSCAN algorithm may be used for clustering.

The subset of URL request parameters is divided into several categories in step S814. Correspondingly, every URL request parameter in the subset belongs to one of the categories. Similar to clustering the subset of directories in the URL string, the clustering outlier for each URL request parameter may be obtained by determining the percentile of the category to which the URL request parameter belongs. Based on the clustering outlier, a total outlier of the corresponding URL may be further determined, wherein, the total outlier will be equal to the corresponding clustering outlier when only the subset of URL request parameters is clustered. The URL with a total outlier below the threshold is registered in the whitelist.

In addition, any two or all of the three subsets can be clustered after generating a subset of URL strings, a subset of directories in the URL string, and a subset of URL request parameters. In case of clustering the three subsets respectively by way of example, referring to FIGS. 3, 7 and 8, for each URL, the clustering outlier of the URL string, the clustering outlier of the directory in the URL string, and the clustering outlier of the URL request parameter are determined, respectively; then the total outlier of this URL will be a sum of the three clustering outliers. The URL with a total outlier below the threshold is registered in the whitelist.

Alternatively, a URL with a high total outlier can be reported as an attack, registered in the blacklist. In addition, before being registered in the blacklist, the URL with a high total outlier can be filtered through a normal user clustering. Herein, assuming that all the URLs accessed by the users in the largest category should be normal, so a URL belonging to this category will not be registered in the blacklist even if it has a high total outlier.

Figure 9:
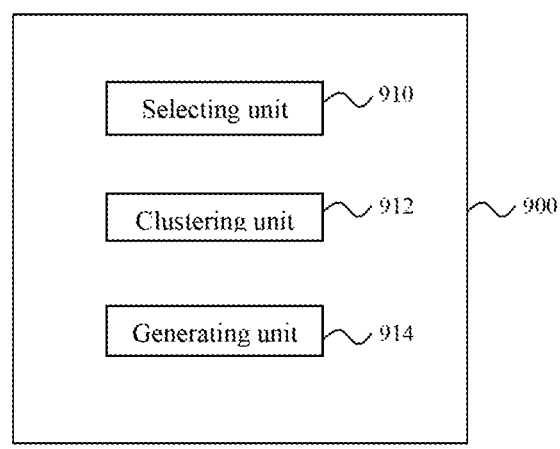
FIG. 9 is a functional block diagram of a device for detecting a website attack according to the present invention.

The device 900 for detecting a website attack according to the present invention as illustrated in FIG. 9 comprises a selecting unit 910, a clustering unit 912 and a generating unit 914. The selecting unit 910 is used to select multiple uniform resource locators from history access records of a website; the clustering unit 912 is used to cluster the multiple uniform resource locators; and the generating unit 914 is used to generate a whitelist from the multiple generating unit according to a clustering result.

The functional modules 910, 912 and 914 of the device 900 may be implemented by hardware, software or combination of hardware and software so as to perform the above-mentioned method steps according to the present invention. In addition, the selecting unit 910, the clustering unit 912 and the generating unit 914 may be combined or further decomposed into sub-modules to perform the above-mentioned method steps according to the present invention. Therefore, any possible combination, decomposition or further definition of the above-mentioned functional modules shall be fallen within the scope of the appended claims.

The present invention is not limited to the specific description described above, and any changes that are readily apparent to those skilled in the art on the basis of the above description are within the scope of the present invention.

The invention claimed is:

1. A method for detecting a website attack, comprising:
selecting multiple uniform resource locators (URLs) from history access records of a website;
clustering the multiple uniform resource locators; and
generating a whitelist from the multiple uniform resource locators according to a result of clustering; wherein clustering the multiple uniform resource locators comprises:
decomposing each of the multiple uniform resource locators into a URL string, a directory in the URL string and a URL request parameter to generate a subset of URL strings, a subset of directories in the URL string, and a subset of URL request parameters, wherein,
the multiple uniform resource locators are clustered according to at least one of the subset of URL strings, the subset of directories in the URL string and the subset of URL request parameters,
wherein in a case where the multiple uniform resource locators are clustered according to the subset of URL strings, the subset of directories in the URL string and the subset of URL request parameters, respectively, the percentiles of a categories to which each URL string, URL directory, and URL request parameter in the corresponding subset belongs are determine as an outlier.

2. The method according to claim 1, wherein the multiple uniform resource locators correspond to a HTTP response status that a request has been successful.

3. The method according to claim 1, wherein at least a portion of the multiple uniform resource locators correspond to a user belonging to the largest category obtained by clustering users of the website.

4. The method according to claim 1, wherein in a case the multiple uniform resource locators are clustered according to the subset of URL strings,
a number, a globally unique identifier or a BASE64-encoded substring in the URL string is identified to determine a URL string clustering distance.

5. The method according to claim 1, wherein in a case the multiple uniform resource locators are clustered according to the subset of directories in the URL string,
a directory clustering distance is determined by subtracting the number of duplicate directories in two directories from the number of directories obtained by splicing the directories in two URL strings.

6. The method according to claim 1, wherein in a case the multiple uniform resource locators are clustered according to the subset of URL request parameters,
for a unique parameter name in each of the multiple uniform resource locators, all of the parameter values that have appeared corresponding to the unique parameter name are clustered.

7. The method according to claim 1, wherein all of the parameter names that appear in the multiple uniform resource locators are individually clustered.

8. The method according to claim 1, wherein a total outlier of a corresponding URL is determined by adding the outlier of the URL string, the outlier of the directory in the URL string, and the outlier of the URL request parameter together.

9. The method according to claim 8, wherein a uniform resource locator whose total outlier is below a threshold is registered into a whitelist.

10. A device for detecting a website attack, comprising hardware performing instructions stored in a non-transitory computer readable medium which executes steps in following units:
a selecting unit for selecting multiple uniform resource locators (URLs) from history access records of a website;
a clustering unit for clustering the multiple uniform resource locators, and
a generating unit for generating a whitelist from the multiple uniform resource locators according to a clustering result wherein the clustering unit is further configured to decompose each of the multiple uniform resource locators into a URL string, a directory in the URL string and a URL request parameter to generate a subset of URL strings, a subset of directories in the URL string, and a subset of URL request parameters, wherein,
the multiple uniform resource locators are clustered according to at least one of the subset of URL strings, the subset of directories in the URL string and the subset of URL request parameters,
where the multiple uniform resource locators are clustered according to the subset of URL strings, the subset of directories in the URL string and the subset of URL request parameters, respectively, the percentiles of a categories to which each URL string, URL directory, and URL request parameter in the corresponding subset belongs are determine as an outlier.

* * * * *